(12) United States Patent
Roberts

(10) Patent No.: US 9,919,874 B2
(45) Date of Patent: Mar. 20, 2018

(54) COMPLIANT TIRE

(71) Applicant: GOODRICH CORPORATION, Charlotte, NC (US)

(72) Inventor: Aaron Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 469 days.

(21) Appl. No.: 14/202,949

(22) Filed: Mar. 10, 2014

(65) Prior Publication Data
US 2015/0251855 A1    Sep. 10, 2015

(51) Int. Cl.
| B65G 39/02 | (2006.01) |
|---|---|
| B65G 13/02 | (2006.01) |
| B65G 13/00 | (2006.01) |
| B64D 9/00 | (2006.01) |
| B60C 7/10 | (2006.01) |
| B60C 11/00 | (2006.01) |

(52) U.S. Cl.
CPC ............. *B65G 39/02* (2013.01); *B64D 9/00* (2013.01); *B65G 13/02* (2013.01); *B60C 2007/107* (2013.01); *B60C 2011/0016* (2013.01); *B60C 2011/0025* (2013.01); *B64D 2009/006* (2013.01); *Y02T 50/46* (2013.01)

(58) Field of Classification Search
None
See application file for complete search history.

(56) References Cited

U.S. PATENT DOCUMENTS

| | | | | |
|---|---|---|---|---|
| 3,470,933 A | * | 10/1969 | Molnar | B29C 41/003 152/429 |
| 3,578,812 A | * | 5/1971 | Taussig | B29C 45/1459 152/379.3 |
| 3,978,975 A | * | 9/1976 | Herbes | B64D 9/00 198/782 |
| 4,095,637 A | | 6/1978 | Kirshnan | |
| 6,085,815 A | | 7/2000 | Piper et al. | |

(Continued)

FOREIGN PATENT DOCUMENTS

| CN | 101048314 | 10/2017 |
|---|---|---|
| EP | 0403177 | 12/1990 |

(Continued)

OTHER PUBLICATIONS

Extended European Search Report dated Nov. 4, 2015 in European Application No. 15157796.2.

(Continued)

*Primary Examiner* — Kavel Singh
(74) *Attorney, Agent, or Firm* — Snell & Wilmer L.L.P.

(57) ABSTRACT

A powered drive unit system of an aircraft is disclosed herein. The system may include a support structure, a plurality of motor driven tires configured to present a horizontal motive force on an object, and an axle of a tire. The axle of the tire may be retained by the support structure. The object may move relative to the static support structure. The location of an axle of the tire may be rigidly fixed in position relative to the support structure housing the axle. Normal force on the object by the tire may be created through tire compliance. The axle of the tire may be retained by the support structure. The axis of rotation of the axle may be in a substantially static three dimensional plane relative to the support structure.

14 Claims, 6 Drawing Sheets

(56) References Cited

U.S. PATENT DOCUMENTS

| | | | | |
|---|---|---|---|---|
| 6,420,846 | B1 * | 7/2002 | Wolfe | B64D 9/00 |
| | | | | 198/780 |
| 7,717,252 | B2 * | 5/2010 | Stewart | B64D 9/00 |
| | | | | 193/35 SS |
| 8,555,941 | B2 | 10/2013 | Perron et al. | |
| 8,567,461 | B2 | 10/2013 | Williams et al. | |

FOREIGN PATENT DOCUMENTS

| | | | | |
|---|---|---|---|---|
| EP | 0561222 | | 9/1993 | |
| EP | 1529874 | A1 * | 5/2005 | D06F 58/06 |

OTHER PUBLICATIONS

EP Office Action dated Feb. 8, 2017 in EP Application No. 15157796.2.
Chinese Office Action dated Sep. 20, 2017 in Chinese Application No. 2015101036113.

* cited by examiner

COMPLIANT TIRE

FIELD

The present disclosure relates to a tire, and more specifically, to a tire configured for controlled flexing under a load.

BACKGROUND

Typically large aircraft utilize powered cargo loading systems comprising a plurality of powered drive units (PDUs) 50 to assist the loading of cargo and equipment into the aircraft (see FIG. 1). A train and/or series of PDUs 50 may serve to assist pallets and containers of desired dimensions to travel down from fore to aft and from aft to fore of an aircraft (e.g., down the body of the aircraft), typically to the main and lower cargo compartments of the aircraft. Conventionally, PDUs 50 comprise a tire 10 to provide motive force to a Unit Load Device (ULD) and a separate mechanical lift system 20 to provide lift between the PDU 50 and its support structure 30. The tire 10 may be a thin layer of friction material over molder onto a large diameter rigid hub. It would be desirable to reduce the part count and potential points of failure within these and other similar systems.

SUMMARY

In various embodiments, a tire comprising an elastomeric material layer comprising an outer diameter contact surface and a hub coupled to the elastomeric material layer is disclosed herein. An axle coupled to the hub is fixed relative to a static support structure housing the tire. The elastomeric material layer may be designed to achieve a selected/desired spring constant.

According to various embodiments, a powered drive unit system of an aircraft is disclosed herein. The system may include a support structure, a plurality of motor driven tires configured to present a horizontal motive force on an object. An axle of the tire may be retained by the support structure. The object may move relative to the static support structure. The location of an axle of the tire may be rigidly fixed in position relative to the support structure housing the axle. The axle of the tire may be retained by the support structure. The axis of rotation of the axle may be in a substantially static three dimensional plane relative to the support structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Figure 2:
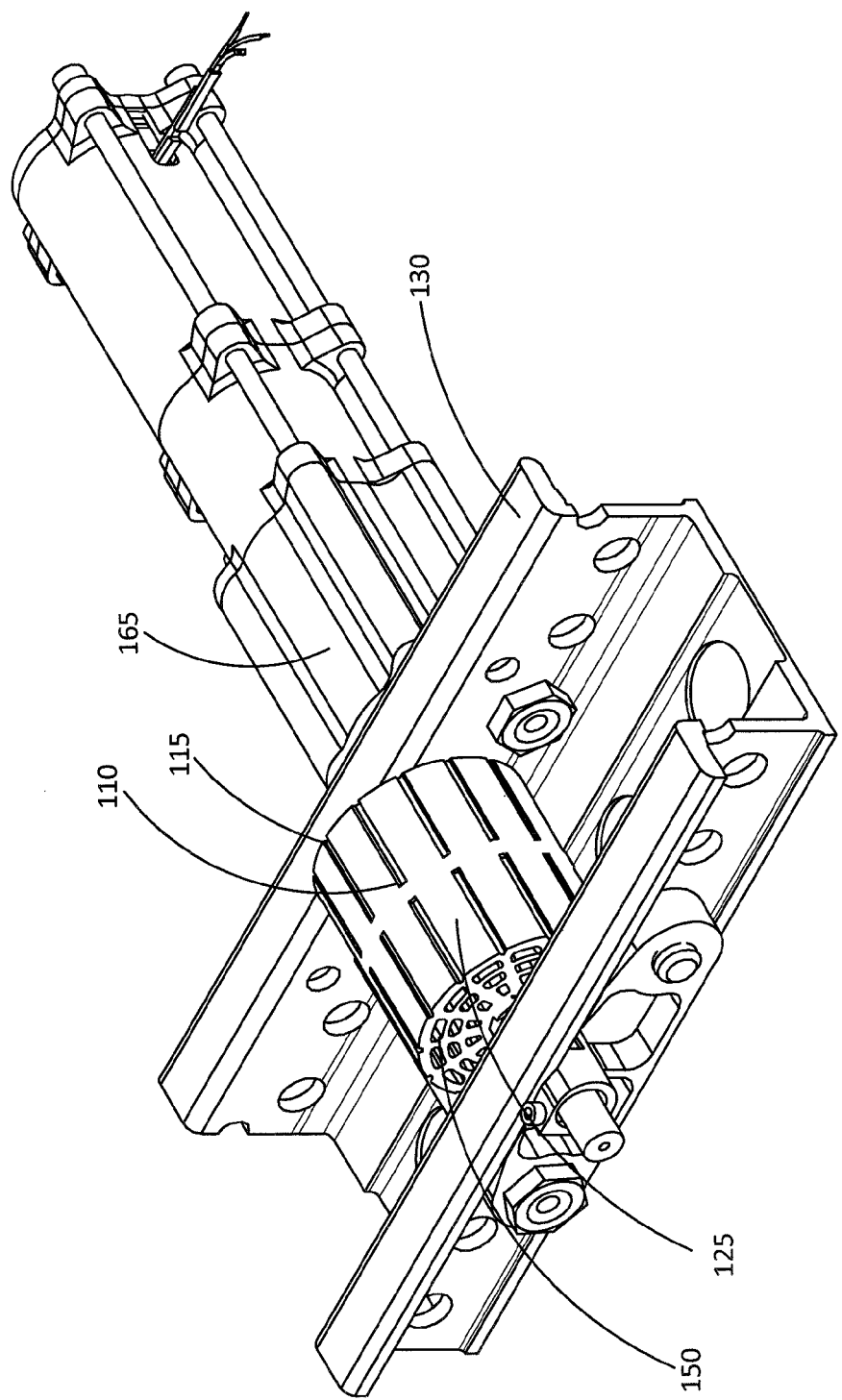
FIG. 2 illustrates an isometric view of a compliant tire of a powered drive unit according to various embodiments.
Figure 5:
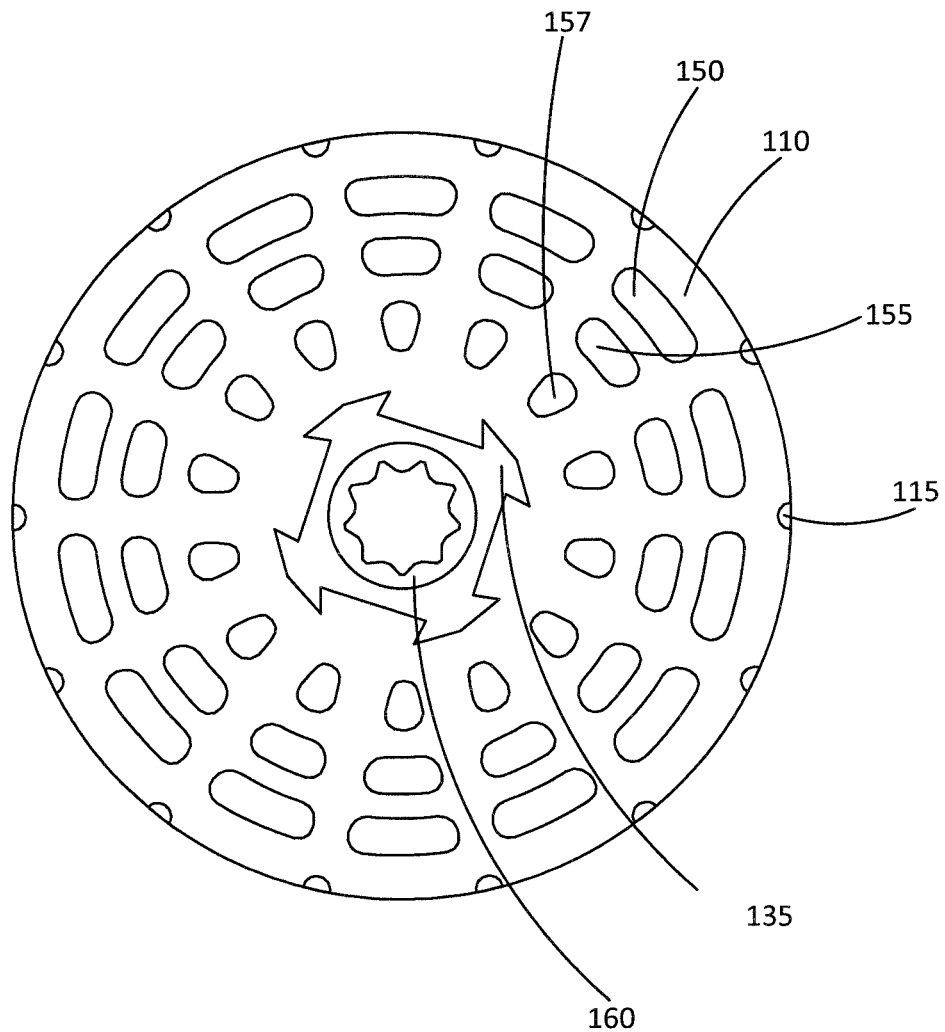
FIG. 5 illustrates a side view of the compliant tire of FIGS. 2-4 according to various embodiments.

According to various embodiments and with reference to FIG. 2, an improved tire 110 is disclosed. Tire 110 may comprise an elastomeric material layer having an outer facing contact surface 125. Contact surface 125 may be along the outer diameter of the tire 110. The elastomeric material layer may be configured to have a desired spring constant. With brief reference to FIG. 5, a hub 135 may be coupled to the elastomeric material layer. An axle 160 coupled to the hub 135 may be fixed relative to a static (relatively stationary) support structure 130 housing axle 160 and tire 110. Stated another way, the axis of rotation of the axle 160 is held substantially static in a three dimensional plane relative to the support structure. In this way, a first tire 110 may rotate and present a motive force on cargo and/or an object and move the object generally horizontally to be received by a second tire while the first tire 110 and its axis of rotation is held in a fixed location by a support structure. This is contrary to the wheel/tire of a vehicle where the tire of the vehicle moves the support structure of the axle and the axle as the tire/wheel presents a force on the ground.

For instance, tire 110 may be configured to radially flex and/or deform in a controlled manner under a load. Tire 110 comprises a strategically defined geometry and material designed to allow for the desired deflection under a given load. Tire 110 may be any desired dimensions. In a UDL application, tire 110 may be between about 1.5-3.5 inches in diameter and between 1 and 4 inches wide. For example, tire 110 may be approximately 2.25 inches in diameter and approximately 2.5 inches wide for instance so that it may be utilized in a legacy PDU retro-fit application.

Commercially available formulations of elastomeric materials can be used to achieve the desired performance of the individual tire 110. For instance, base material types may include nitrile rubber, carboxylated nitrile rubber, hydrogenated nitrile butadiene rubber, and polyether polyurethane. The following table, table 1, describes basic material properties and range of values applicable to various embodiments of the disclosure. (Note, a compound's overall toughness and extrusion resistance modulus is the force (stress) in pounds per square inch (psi) required to produce elongation (strain)).

TABLE 1

| Material Property | Hardness (Shore A) | 100% Tensile Modulus (M100) (psi) | Tensile Strength (psi, minimum) |
| --- | --- | --- | --- |
| Range of Values | 60-90 | 200-1000 | 350 |

Tire 110, may be formed by any desired process. For instance, tire 110 may be formed using a poured cast, injection molding, additive manufacturing, and/or the like. Tire 110 may be any desired shape, however, (with brief reference to FIG. 4) according to various embodiments, tire 110 is generally disc shaped, with one circumferential outward facing edge 125 between two generally parallel circular faces 120.

Tire 110 comprises tractive elements configured to interface with and provide motive force to the ULD system. Tire 110 comprises structural elements which will deform under load and allow the tractive element to conform to the ULD system. For instance, tire 110 is designed with the appropriate spring constant to generate the operational normal (e.g., lift) force while maintaining acceptable motive force levels. Hooke's law provides that the force "F" needed to extend or compress a spring by some distance, "X" is proportional to that distance. That is: $F=kX$ where k is a constant factor characteristic of the spring, its stiffness. This equation may be assumed to apply to the elastomeric material of tire 110, (i.e., the elastomeric material of tire 110 is Hookean). In this way, tire 110 serves to dampen the force applied by the cargo rather than having a separate mechanical dampening structure.

Figure 3:
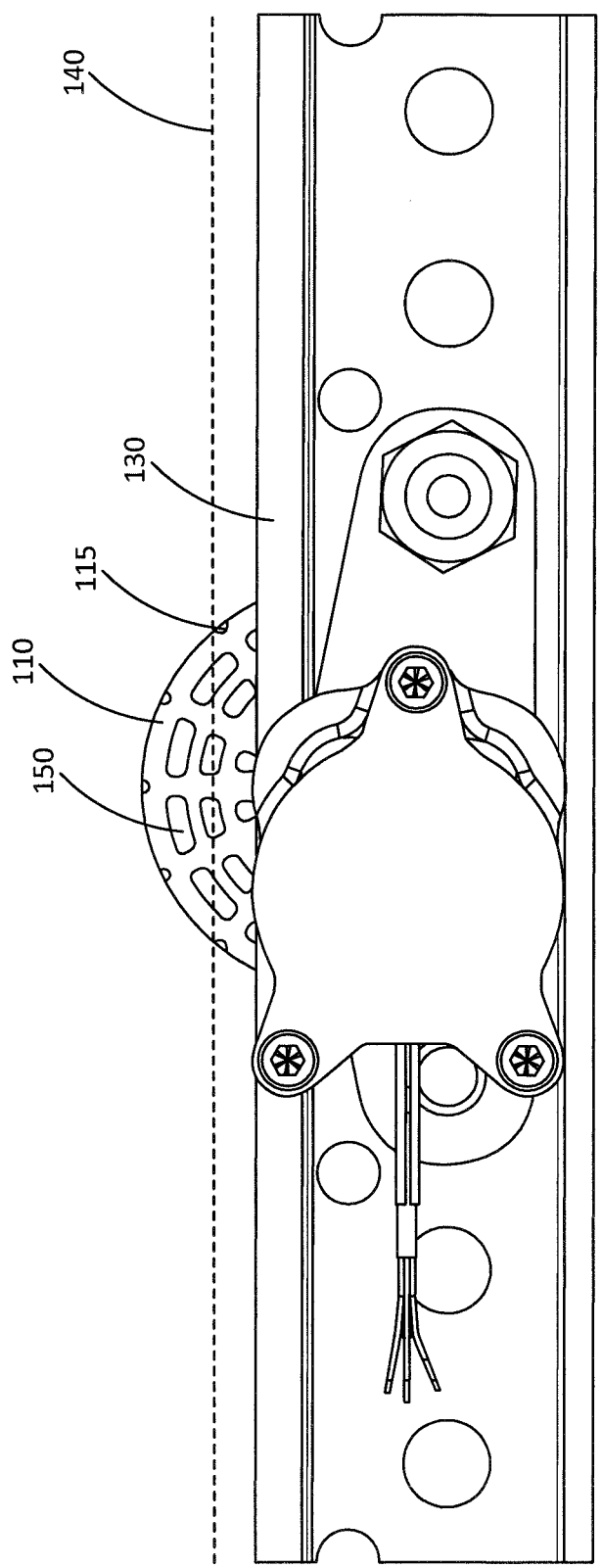
FIG. 3 illustrates a side view of the compliant tire of FIG. 2 according to various embodiments.

For instance, the spring constant allows tire 110 to deform such that its highest point is not less than support structure 130 as depicted FIG. 3. Preferably, the spring constant is determined and the tire is designed such that the lowest level of the cargo travels along the conveyor plane 140. For instance, a bottom surface of a pallet may be designed to generally travel along conveyor plane 140. Stated another way, conveyor plane 140 may define the general vertical height of transport for a container. Traction and/or contact by the container above the level of conveyor plane 140 is desired so that a down-force on the tire 110 is present. Conveyor plane 140 may define a nominal level. Depending on the loading of the cargo, a tolerance may allow compression of tire 110 beyond conveyor plain 140.

According to various embodiments, in an aircraft mounted embodiments, between about 50 to about 160 individual PDUs may work together in both series and parallel to provide motive force to an object and/or cargo. For instance, 2 to 4 lines of PDUs in series may form a path for cargo to travel. PDUs may be spaced such that 1-6 PDUs are contacting a pallet, object and/or container at any given time. Non-powered passive tires may be disposed between the PDU driven tires 110 to create a smooth path of travel for the cargo.

Unlike legacy systems, the tire 110 of the present disclosure comprises a fixed rotation axis relative to the support structure. Historically, the rotation axis of tire(s) 10 may float and/or flex relative to the support structure. In that regard, the selected spring constant of tire 110 provides improved damping performance without the need for suspension packages and/or other structures that support flexing/floating of the axle relative to the support structure.

Tire 110 comprises an attaching element for coupling tire 110 to the PDU. The attaching element may take any form factor; however, it may be a hub 135. Hub 135 may be configured to connect the output interface of the PDU, such as a gear and/or drive axle 160 of the PDU to the structural elements and/or solid elastomeric body of tire 110. The axle of tire 110 may be rigidly mounted to a stationary supporting structure 130. The stationary support structure may be a track fixed in position to a floor surface.

Figure 1:
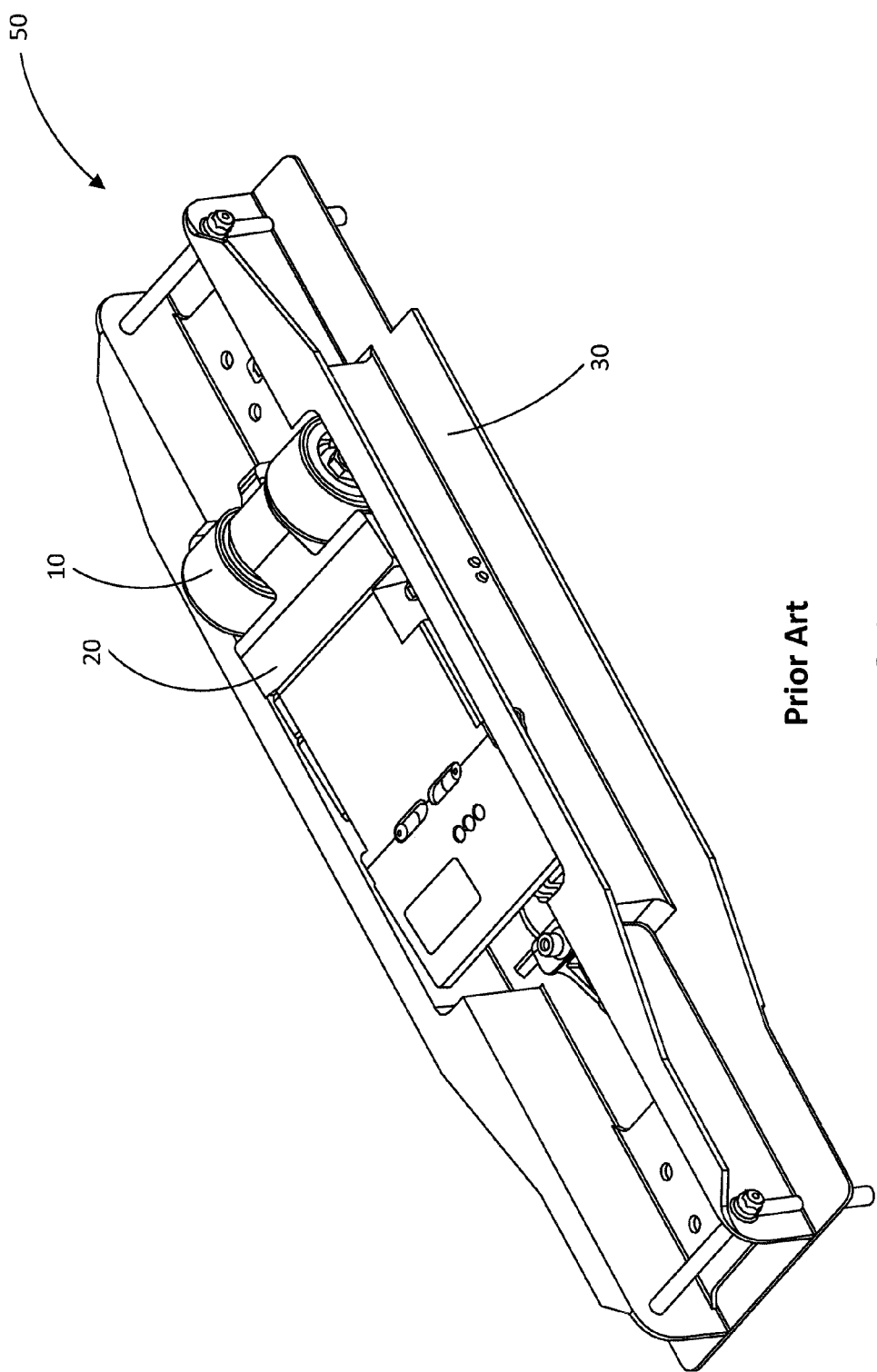
FIG. 1 illustrates an isometric view of a conventional powered drive unit.

Though tire 110 may be used in concert with one or more legacy lift systems (such as legacy lift system 20 depicted in FIG. 1) the function of the conventional lift system 20 is built into the structure and design of tire 110. Stated another way, the solid elastomer structure of tire 110 may eliminate the need for a separate legacy lift system 20 coupled to the PDU.

Removing the legacy lift system 20, which may be mechanical lift system, such as a hydraulic, pneumatic, spring, cam driven system, and/or the like, simplifies the overall design, reduces replacement part needs, reduces point of failure opportunities and positions the lift force closer to the motive element, (e.g., tire 110). Also, the attachment of the PDU to a support structure 130 is simplified as the PDU housing no longer needs to move relative to the support structure which reduces the stresses on the PDU body overall. Also, a reduction in weight is achieved through a part count reduction. Moreover, polymers used in the place of the rigid wheels of legacy systems may result in a weight reduction, which in aerospace applications may yield fuel savings and/or additional efficiencies.

The geometry and material properties may be optimized to achieve a desired spring constant which will produce a minimum normal (lift) force while still meeting the tractive force requirement. The geometry utilize an elastomeric material to generate the compliance and the friction surface, which may be bonded to a small diameter hub 135, such as an aluminum hub, which will interface with an output gear of the PDU. The elastomeric material may be mechanically fitted to hub 135, such as through a sheer connection. In turn, the output gear of the PDU is driven by a software controlled motor 165 (as depicted in FIG. 2). The software controlled motor 165 may be electrically coupled to a control panel and/or user interface for an operator to manipulate.

Figure 4:
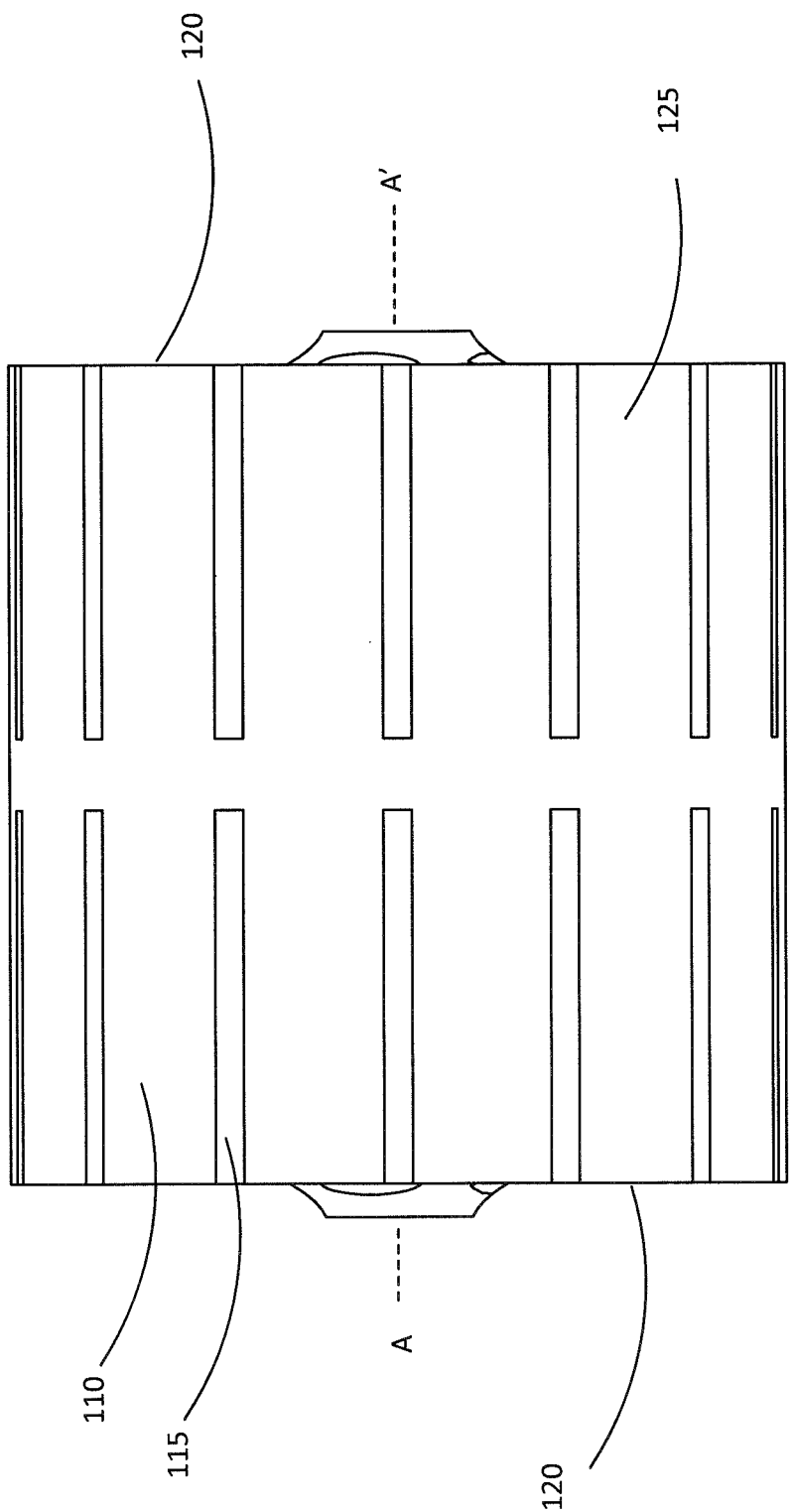
FIG. 4 illustrates a top view of the compliant tire of FIGS. 2 and 3 according to various embodiments.

According to various embodiments and with reference to FIGS. 2-5, tire 110 may comprise slots 150, 155, 157. Slots 150, 155, 157 may span the entire width of tire 110 creating a series of continuous through channels. Slots 150, 155, 157 may increase the effective surface area available for cooling. Slots 150, 155, 157 may be configured to deform, generally in the direction of force presented by the cargo. This direction of force may be towards a centerline (A-A' as shown in FIG. 4) of the axis of rotation of the hub 135. Open slots 150, 155, 157 comprise less total tire 110 volume than the volume of first elastomer material. Though slots 150, 155, 157 are depicted as being gradually increasing in volume from the interior diameter to the outer diameter of tire 110, they may be any desired shape and/or size. Slots 150, 155, 157 advantageously reduce levels of mechanical fatigue and thermal fatigue during loaded rotation of tire 110. Slots 150, 155, 157 may be formed in the same integral unit of the first elastomer material.

The outer diameter surface of the first elastomer material may comprise integral surface characteristics 115 to achieve the desired friction characteristics, such as under both dry and wet conditions. Thus, a separate material is not required to be applied over the first elastomer material of tire 110. These surface characteristics 115 may comprise any shape and/or pattern, but in as depicted in FIGS. 2-5 are grooves formed in the exterior contact surface of the first elastomer material.

According to various embodiments (not shown), the outer surface of tire 110 that contacts cargo may be coated with and/or fitted with a wear or tear resistant material which is coupled to, such as bonded to, the first elastomer material. The wear and/or tear resistant material may comprise surface characteristics, such as a tread, to enhance delivering a motive force to the cargo. Tire 110 may be configured to be located within a conventional conveyance tray, such as those used on lower deck cargo compartments of aircraft.

Tire 110 may be stationary with respect to the object that it provides the motive force upon. Stated another way, tire 110 may rotate about an axle; however, the axle may be stationary and/or static relative to its support structure. Though tire 110 has been disclosed herein as being compatible with use on aircraft systems, such as ULDs, other uses are contemplated, such as for providing motive force in factories, package delivery centers, luggage transportation and/or locations where goods are desired to be moved.

Figure 6:
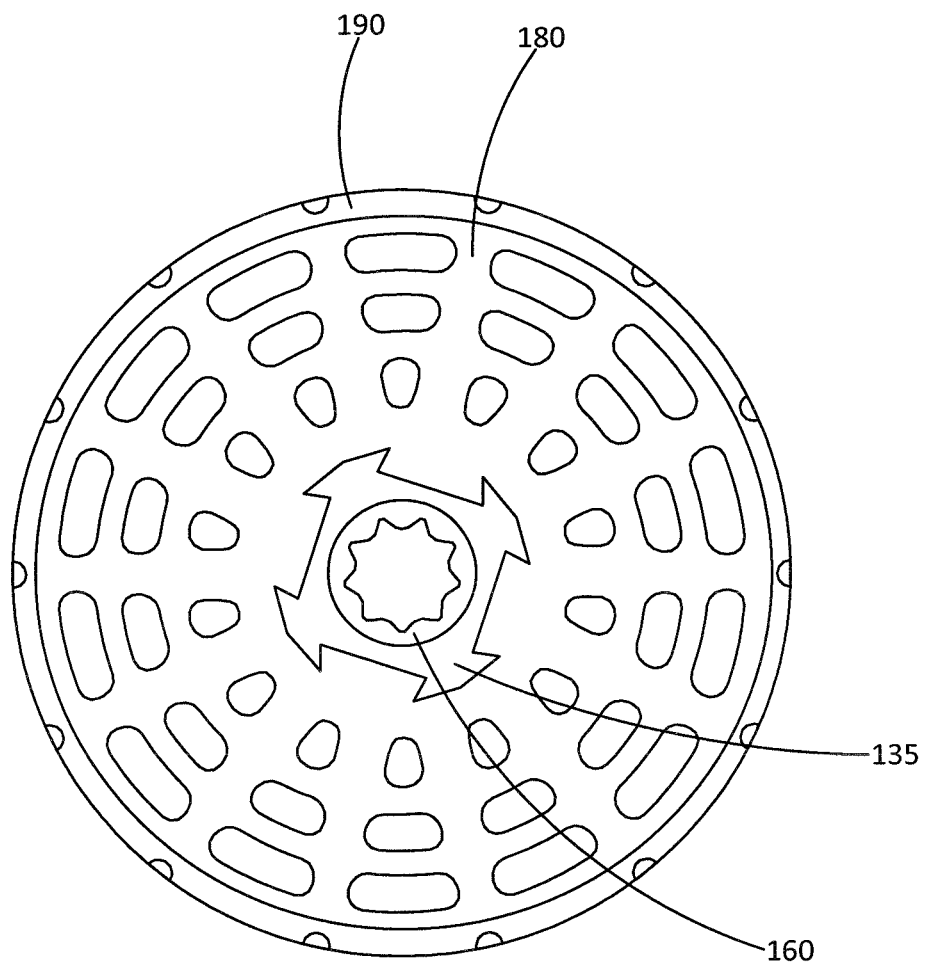
FIG. 6 illustrates a side view of a compliant tire comprising a first elastomer material layer and the second elastomer material layer according to various embodiments.

According to various embodiments and with reference to FIG. 6, a first elastomeric material layer 190 of tire 110 may act as the friction surface which will be bonded to a second elastomeric material layer 180 configured to act as the compliant supporting interface. First elastomeric material layer 190 and second elastomeric material layer 180 may be formed from the same material and/or different materials. First elastomeric material layer 190 and second elastomeric material layer 180 may comprise the same or different spring constants. First elastomeric material layer 190 may have a larger outer diameter than the outer diameter of second elastomeric material layer 180. Second elastomeric material layer 180 may be bonded to a small diameter hub 135 to interface with the output gear 160 of the PDU. A benefit of utilizing second elastomeric material layer 180 may be that each material may then be optimized for its specific function and hence optimized for performance. With this geometry, high levels of compliance (the ability for tire 110 to compress under vertical load and/or a load in the direction of the centerline of the axis of rotation of tire 110) are able to be achieved with relatively low levels of strain energy. Additionally, the volume of material performing the work is limited relative to that of a solid tire, such as tire 10 of FIG. 1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. Tire 110 does not comprise a pneumatic bladder.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tire comprising:
    an elastomeric material layer comprising an outer diameter circumferential contact surface, wherein the elastomeric material layer has a selected spring constant; and
    a hub coupled to the elastomeric material layer,
    wherein an axle coupled to the hub is fixed relative to a static support structure housing the tire,
    wherein the tire includes a width defined by a first side face and a second side face and comprises internal slots that span the width of the tire, from the first side face to the second side face, creating a series of continuous through channels with the slots configured to deform towards the axle in response to a force at the circumferential contact surface.

2. The tire of claim 1, wherein the tire is an element of a powered drive unit of an aircraft.

3. The tire of claim 1, wherein the spring constant of the tire is selected such that a load on the outer diameter circumferential contact surface compresses a highest top contact surface of the tire to a level that is substantially even with a conveyor plane.

4. The tire of claim 1, wherein a base material of the elastomeric material layer is selected from at least one of nitrile rubber, carboxylated nitrile rubber, hydrogenated nitrile butadiene rubber, and polyether polyurethane.

5. The tire of claim 1, wherein a hardness of the elastomeric material layer is with a range of about 60-90 Shore A hardness.

6. The tire of claim 1, wherein a minimum tensile strength of the tire is about 350 pounds per square inch.

7. The tire of claim 1, wherein a force of the elastomeric material layer required to produce a 100% elongation of the elastomeric material layer is between about 200 and about 1000 pounds per square inch.

8. The tire of claim 1, wherein a normal force on an object making contact with the outer diameter circumferential contact surface is created through tire compliance.

9. The tire of claim 1, wherein the tire is configured to provide horizontal motive force to an object making contact with the outer diameter circumferential contact surface, wherein the object moves relative to the static support structure.

10. The tire of claim 1, wherein at least one of a motor driven gear and a motor driven axle is coupled to the hub, wherein the hub is directly coupled to the elastomeric material layer.

11. The tire of claim 1, wherein the slots increase an effective surface area available for cooling the tire.

12. The tire of claim 1, wherein the slots are configured to compress in a direction of a force on the outer diameter circumferential contact surface.

13. A powered drive unit system of an aircraft comprising:
a static support structure configured to retain an axle of a motor driven tire; and
a motor driven tire configured to present a horizontal motive force,
wherein a first side face of the motor driven tire, a second side face of the motor driven tire and an outward facing circumferential contact surface comprise an integral elastomeric material,
wherein a location of the axle is rigidly fixed in position relative to the static support structure,
wherein the horizontal motive force is configured to move an object relative to the static support structure,
wherein the axle of the motor driven tire is retained by the static support structure, and
wherein the motor driven tire comprises a width defined by a first side face and a second side face, and slots that span the width of the tire, creating a series of continuous through channels with the slots configured to deform towards the axle in response to a force at the circumferential contact surface.

14. The powered drive unit system of an aircraft of claim 13, wherein a spring constant of the motor driven tire is selected such that a load of the object on the motor driven tire compresses a highest top contact surface of the motor driven tire to a level that is substantially even with a conveyor plane.

* * * * *